Sept. 18, 1923.
R. L. STOCKARD
MUD LUG
Filed July 22, 1922   2 Sheets-Sheet 1
1,468,582
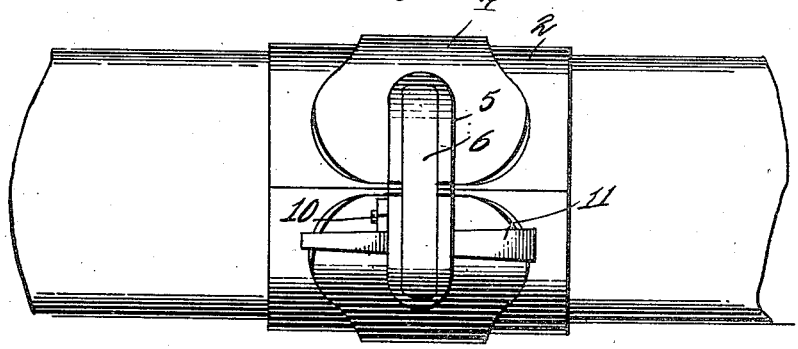
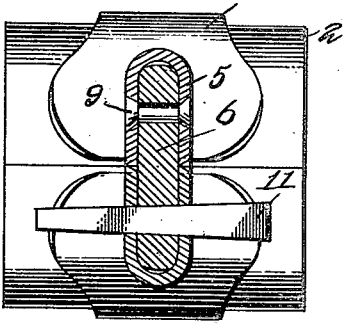
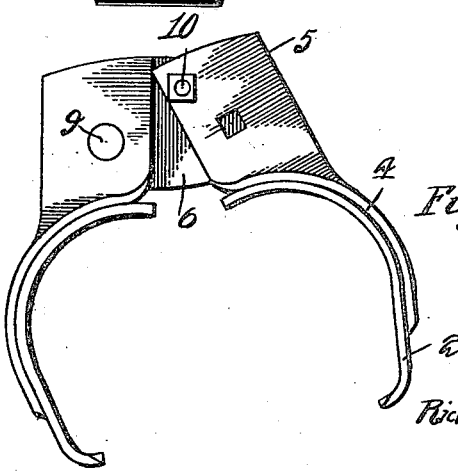
Inventor
Richard L. Stockard
Witnesses
By Richard P. Owen
Attorney

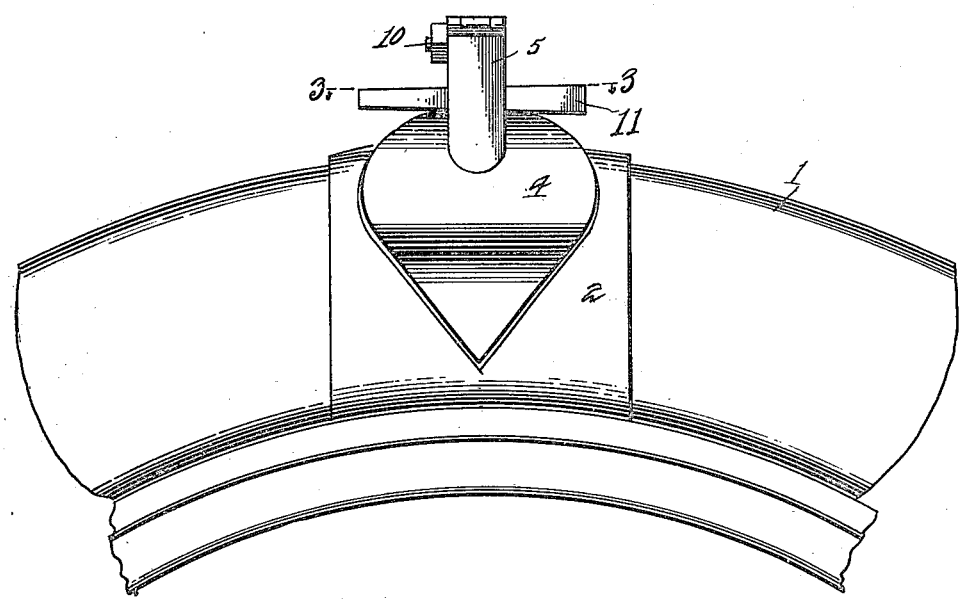
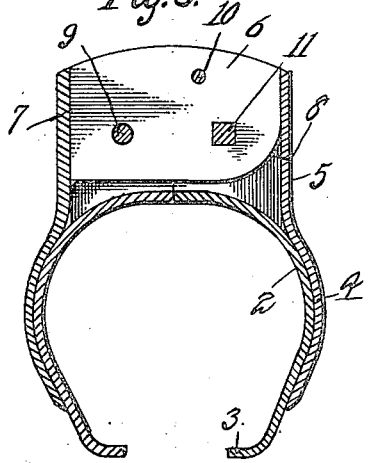

Patented Sept. 18, 1923.

1,468,582

UNITED STATES PATENT OFFICE.

RICHARD L. STOCKARD, OF FORREST CITY, ARKANSAS.

MUD LUG.

Application filed July 22, 1922. Serial No. 576,719.

*To all whom it may concern:*

Be it known that I, RICHARD L. STOCKARD, a citizen of the United States, residing at Forrest City, in the county of St. Francis and State of Arkansas, have invented certain new and useful Improvements in a Mud Lug, of which the following is a specification.

The present invention relates to a mud lug adapted to be attached to the tire of a vehicle and has for its principal object to provide a device of this nature which may be easily attached to and detached from the tire when necessary.

Another important object of the invention is to provide a lug of this nature which will be simple and efficient in construction, reliable in operation, inexpensive to manufacture, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawings:—

Figure 1 is a plan view of the device showing the same attached to a tire,

Figure 2 is a side elevation thereof,

Figure 3 is a section taken therethrough substantially on the line 3—3 of Figure 2 looking in the direction of the arrows, Figure 4 is an edge elevation of the lugs showing the same partially open, and Figure 5 is a longitudinal section through the device.

Referring to the drawing in detail it will be seen that 1 designates a tire which may be of any preferred construction upon which the lug is adapted to be placed. The lug comprises a pair of gripping jaws 2 adapted to grasp the tire as is shown to advantage in Figures 1 and 2 it being noted that the ends 3 of these jaws are extended so as to be substantially in the same plane with each other thereby fitting between the tire and the rim of the wheel to which the tire is attached. A plate 4 is fixed to each jaw 2 and includes a U-shaped extension 5. A plate 6 is situated in the two U-shaped extensions 5 and is provided with the straight edge 7 and the partially curved edge 8. A rivet 9 passes through the extension 5 adjacent the straight edge 7 and a pin 10 extends through the extension 5 and plate 6 adjacent its partially curved edge 8 and adjacent the outer side thereof so that the jaw attached thereto may be fulcrumed to an open position as is illustrated in Figure 4. The extension 5 and the block 6 are pierced with square apertures adjacent the partially curved edge 8 so as to receive a wedge pin 11 whereby the two jaws may be held in a fixed or closed position in engagement with the tire 1.

If preferred the lugs can be made to consist simply of four parts, namely, the two jaws, bolt 10 and wedge 11 by molding each jaw 2 and its respective plate as an integral structure, one of the jaws having the block 6 cast integral therewith to fit in a molded socket extension 5 of the co-acting jaw as is well understood. It is noted that by providing the fulcrum pin 10 adjacent the outer edge of the plate 6 and by providing the curved portion of the edge 8 adjacent the lower corner of the block 6 one of the jaws may pivot to an open position when the wedge pin 11 is removed whereby the jaws may be disengaged from the tire.

It is thought that the construction and operation of the lug will be now clearly understood without a more detailed description thereof. It is desired, however, to point out that the present construction which I have disclosed merely relates to the preferred embodiment of the invention and has been given by way of example and that numerous changes in the details of construction and in the combination and arrangement of parts may be resorted to without departing from the spirit of the invention as hereinafter claimed.

Having thus described my invention what I claim as new is:—

1. In combination, a pair of jaws, a pair of plates one fixed to each jaw, lug extensions on the plates, means for pivoting these lug extensions to each other, and means for holding the jaws in a locked or closed position.

2. In combination, a pair of jaws, a pair of plates one on each jaw, U-shaped extensions on the plates, a block situated in the extensions, means for rigidly attaching one U-shaped extension to the block and means for pivotally attaching the other U-shaped extension to the block.

3. In combination, a pair of jaws, a pair of plates one on each jaw, U-shaped extensions on the plates, a block situated in the extensions, means for rigidly attaching one U-shaped extension to the block and means for pivotally attaching the other U-shaped extension to the block, and means for holding the jaws in a locked or closed position.

4. In combination, a pair of jaws, a pair of plates one on each jaw, U-shaped extensions formed on the plates, a block situated in the extensions so as to substantially fill the same when the jaws are in a closed position, one of said U-shaped extensions fixed to the block, means for pivoting the other extension to the block, and a pin adapted to pass through the latter mentioned extension and the block for holding the jaws in a closed position.

5. In combination, a pair of jaws, U-shaped extensions on the jaws, a block situated in the extensions, means for rigidly attaching one U-shaped extension to the block, and means for pivotally attaching the other U-shaped extension to the block.

6. In combination, a pair of jaws, U-shaped extensions on the jaws, a block situated in the extensions, means for rigidly attaching one U-shaped extension to the block and means for pivotally attaching the other U-shaped extension to the block, and means for holding the jaws in a locked or closed position.

In testimony whereof I affix my signature in presence of two witnesses.

RICHARD L. STOCKARD.

Witnesses:
 JAS. F. WOLFE,
 E. JACKSON.